(12) United States Patent
Kim

(10) Patent No.: US 11,393,634 B2
(45) Date of Patent: Jul. 19, 2022

(54) MULTILAYER ELECTRONIC COMPONENT

(71) Applicant: SAMSUNG ELECTRO-MECHANICS CO., LTD., Suwon-si (KR)

(72) Inventor: Do Yeon Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 131 days.

(21) Appl. No.: 16/944,813

(22) Filed: Jul. 31, 2020

(65) Prior Publication Data

US 2021/0082624 A1    Mar. 18, 2021

(30) Foreign Application Priority Data

Sep. 18, 2019 (KR) .................. 10-2019-0114839

(51) Int. Cl.
| | |
|---|---|
| *H01G 4/30* | (2006.01) |
| *H01G 4/012* | (2006.01) |
| *H01G 2/06* | (2006.01) |
| *H01G 4/12* | (2006.01) |
| *H01G 4/008* | (2006.01) |

(52) U.S. Cl.
CPC .............. *H01G 4/30* (2013.01); *H01G 2/065* (2013.01); *H01G 4/008* (2013.01); *H01G 4/012* (2013.01); *H01G 4/1218* (2013.01)

(58) Field of Classification Search
CPC ........ H01G 4/1227; H01G 4/12; H01G 4/232; H01G 4/30; H01G 4/012; H01G 4/228; H01G 4/008; H01G 4/065; H01G 4/1218
See application file for complete search history.

(56) References Cited

U.S. PATENT DOCUMENTS

| | | |
|---|---|---|
| 2013/0220696 A1 | 8/2013 | Otani |
| 2013/0250476 A1* | 9/2013 | Chung ................ H01G 4/232 156/89.16 |
| 2014/0043724 A1 | 2/2014 | Kang et al. |
| 2014/0151101 A1* | 6/2014 | Lee .......................... H01G 4/12 156/89.12 |
| 2014/0182907 A1 | 7/2014 | Lee et al. |
| | (Continued) | |

FOREIGN PATENT DOCUMENTS

| | | |
|---|---|---|
| HR | 10-2014-0021416 A | 2/2014 |
| JP | 5477476 B2 | 4/2014 |
| KR | 10-2014-0086481 A | 7/2014 |

*Primary Examiner* — Michael P McFadden
(74) *Attorney, Agent, or Firm* — Morgan, Lewis & Bockius LLP

(57) ABSTRACT

A multilayer electronic component includes a body including dielectric layers and a capacitance forming portion and upper and lower cover portions respectively disposed on and below the capacitance forming portion, and including first and second surfaces opposing each other in a layering direction, an external electrode disposed on the third or fourth surface, connected to the first or second internal electrode, and including an electrode layer extending to a portion of each of the first and second surfaces and a conductive resin layer covering the electrode layer. Tp/Rmax is 30 or higher, in which Rmax is defined as a maximum surface roughness of each of the first and second surfaces on an end of the conductive resin layer, and Tp is defined as a thickness of each of the upper and lower cover portions.

20 Claims, 5 Drawing Sheets

(56) References Cited

U.S. PATENT DOCUMENTS

| | | | | |
|---|---|---|---|---|
| 2016/0284471 A1* | 9/2016 | Mizuno | ................ | H01G 4/1227 |
| 2017/0098506 A1* | 4/2017 | Ando | .................... | H01G 4/2325 |
| 2017/0330688 A1* | 11/2017 | Lim | ....................... | H01G 4/306 |
| 2018/0090271 A1* | 3/2018 | Ito | ........................ | H01G 4/1209 |

\* cited by examiner

MULTILAYER ELECTRONIC COMPONENT

CROSS-REFERENCE TO RELATED APPLICATION(S)

This application claims benefit of priority to Korean Patent Application No. 10-2019-0114839 filed on Sep. 18, 2019 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of a variety of electronic products including imaging devices, such as a liquid crystal display (LCD), a plasma display panel (PDP), and the like, computers, smartphones, mobile phones, and the like, and may be configured to charge electricity in or discharge electricity from the devices.

A multilayer ceramic capacitor may be used as a component of various electronic devices as a multilayer ceramic capacitor is relatively small in size, may secure high capacity and may be easily mounted. As electronic devices such as computers, mobile devices, and the like, have been designed to have reduced sizes and to operate at high power, there has been increased demand for miniaturization and high capacity of multilayer ceramic capacitors.

Also, recently, there has been increased interest in electrical components, and multilayer ceramic capacitors have been required to have high reliability and high strength properties to be used in vehicles or infotainment systems.

To secure properties of high reliability and high strength, a method of changing an external electrode including a general electrode layer to an external electrode having a dual layer structure including an electrode layer and a conductive resin layer has been suggested.

In the case of a dual layer structure including an electrode layer and a conductive resin layer, a resin composition containing a conductive material may be applied to an electrode layer, and the dual layer structure may absorb external impacts and may prevent permeation of a plating solution, thereby improving reliability.

However, as standards of high reliability and high strength properties required in the related field have been raised, a method for further improving high reliability and high strength properties has been required.

SUMMARY

An aspect of the present disclosure is to provide a multilayer electronic component having improved warpage strength properties.

An aspect of the present disclosure is to provide a multilayer electronic component having improved moisture resistance reliability.

According to an aspect of the present disclosure, a multilayer electronic component includes a body including a dielectric layer and a capacitance forming portion configured to form capacitance including first and second internal electrodes alternately layered in a layering direction with the dielectric layer interposed therebetween and upper and lower cover portions respectively disposed on and below the capacitance forming portion, and including first and second surfaces opposing each other in the layering direction, third and fourth surfaces connected to the first and second surfaces and opposing each other, and fifth and sixth surfaces connected to the first to fourth surfaces and opposing each other; a first external electrode disposed on the third surface, connected to the first internal electrode, and including a first electrode layer extending to a portion of each of the first, second, fifth, and sixth surfaces and a first conductive resin layer covering the first electrode layer; and a second external electrode disposed on the fourth surface, connected to the second internal electrode, and including a second electrode layer extending to a portion of each of the first, second, fifth, and sixth surfaces and a second conductive resin layer covering the second electrode layer. Tp/Rmax is 30 or higher, in which Rmax is a maximum surface roughness of each of the first and second surfaces on ends of the first and second conductive resin layers, and Tp is a thickness of each of the upper and lower cover portions.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
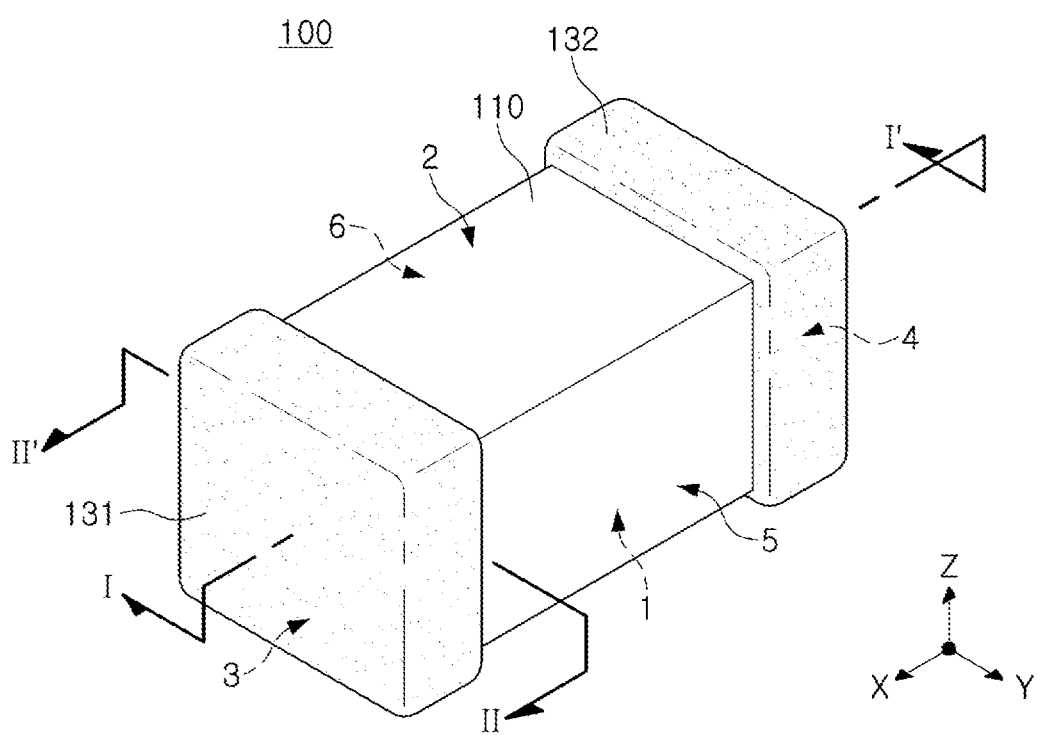
FIG. 1 is a perspective diagram illustrating a multilayer electronic component according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are the same elements in the drawings.

In the drawings, certain elements may be omitted to allow the present disclosure to be clearly described, and to clearly express a plurality of layers and areas, thicknesses may be magnified. The same elements having the same function within the scope of the same concept will be described using the same reference numerals. Further, throughout the specification, it will be understood that when a portion "includes" an element, it can further include another element, not excluding another element, unless otherwise indicated.

In the drawing, an X direction is a second direction, an L direction, or a length direction, a Y direction is a third direction, a W direction, or a width direction, and a Z direction is a first direction, a layering direction, a T direction, or a thickness direction.

Multilayer Electronic Component

FIG. 1 is a perspective diagram illustrating a multilayer electronic component according to an example embodiment.

Figure 2:
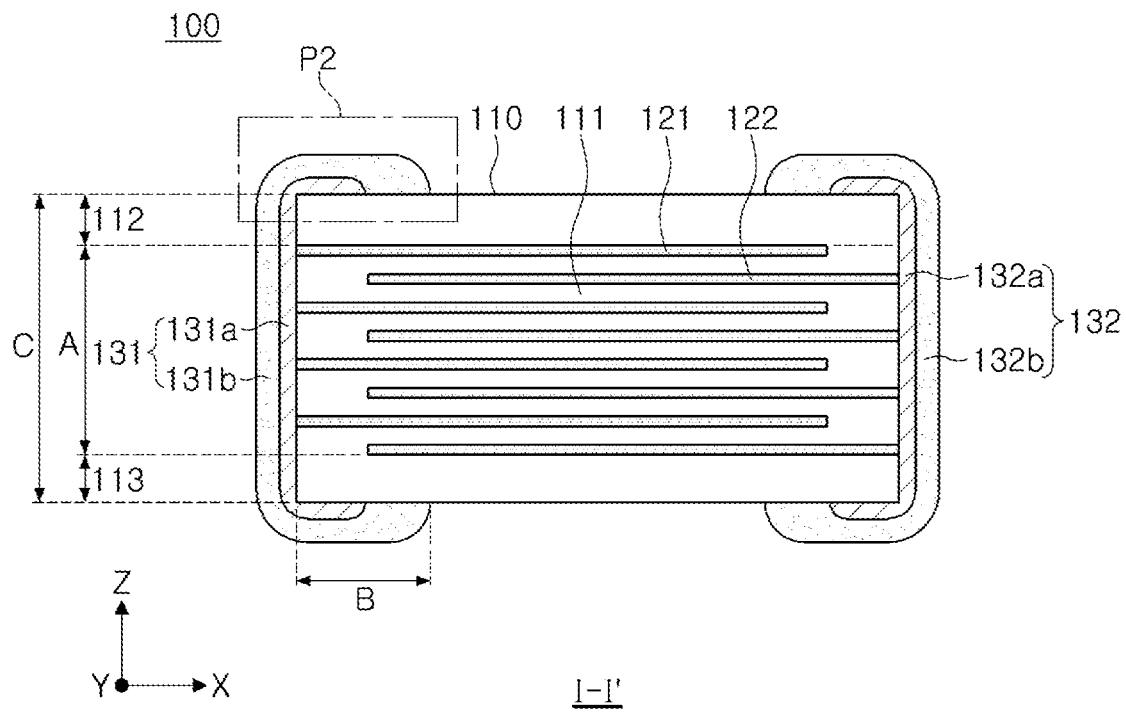
FIG. 2 is a cross-sectional diagram taken along line I-I' in FIG. 1.

FIG. 2 is a cross-sectional diagram taken along line I-I' in FIG. 1.

Figure 3:
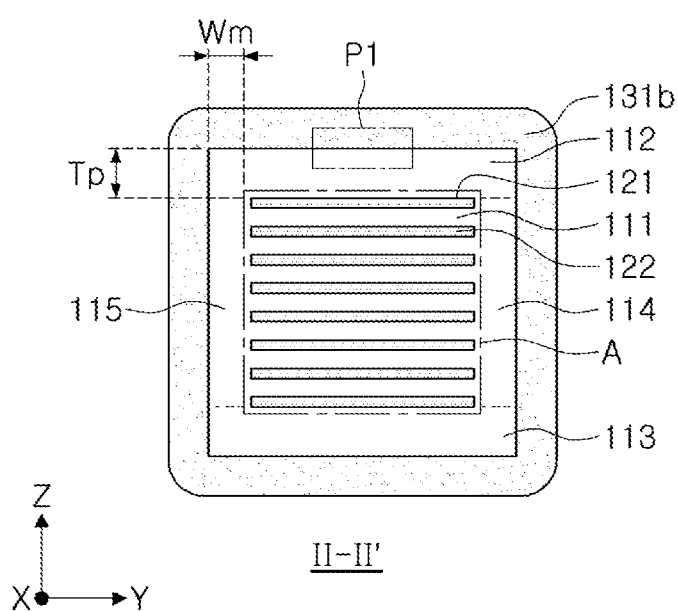
FIG. 3 is a cross-sectional diagram taken along line II-II' in FIG. 1.

FIG. 3 is a cross-sectional diagram taken along line II-II' in FIG. 1.

Figure 4:
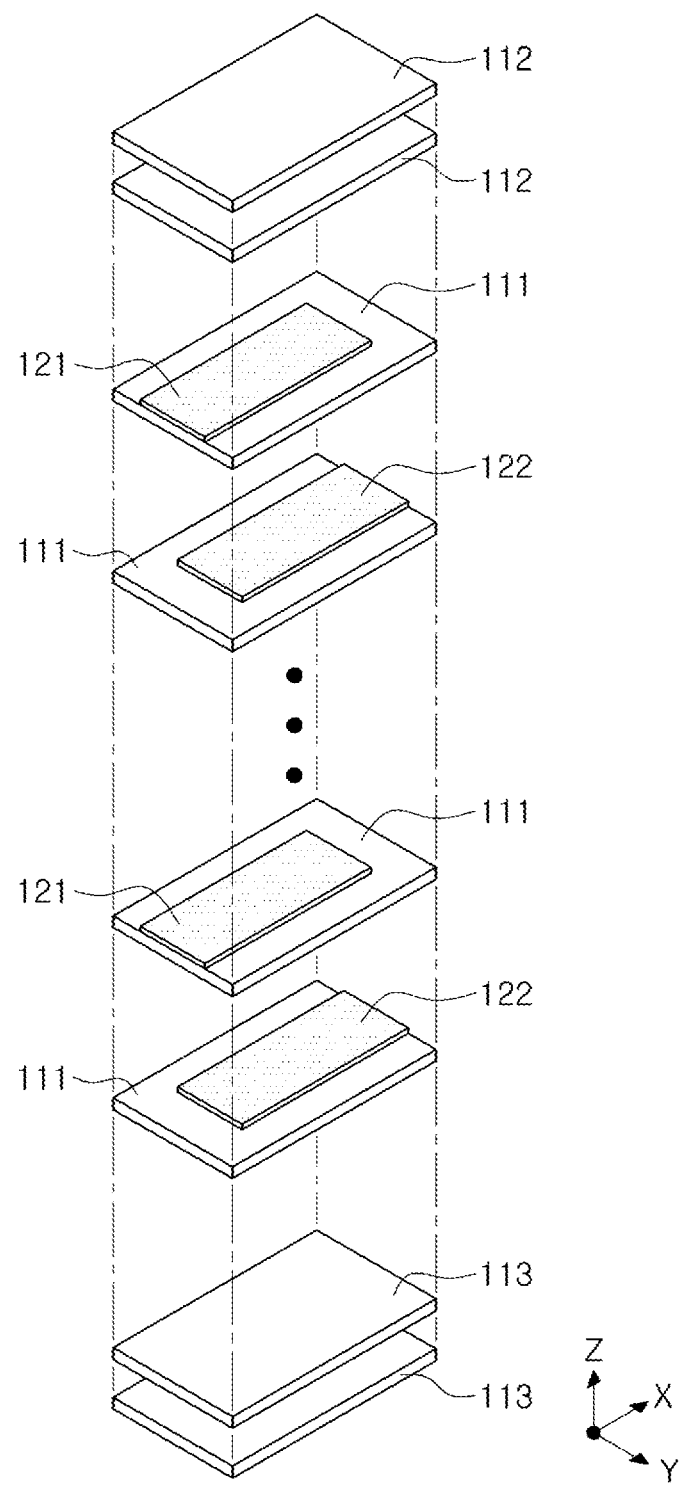
FIG. 4 is an exploded perspective diagram illustrating a body according to an example embodiment of the present disclosure.

FIG. 4 is an exploded perspective diagram illustrating a body according to an example embodiment.

Figure 5:
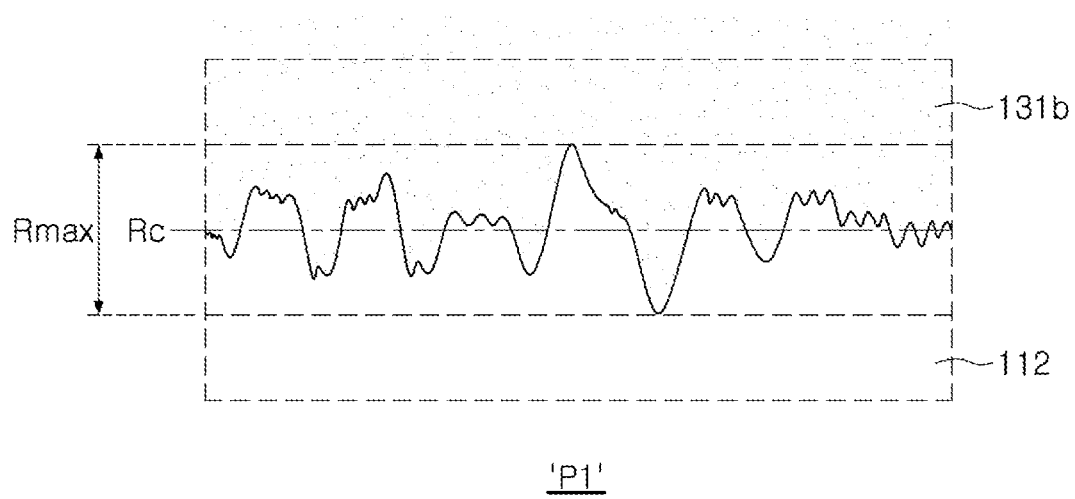
FIG. 5 is an enlarged diagram illustrating region P1 illustrated in FIG. 3.

FIG. 5 is an enlarged diagram illustrating region P1 illustrated in FIG. 3.

Figure 6:
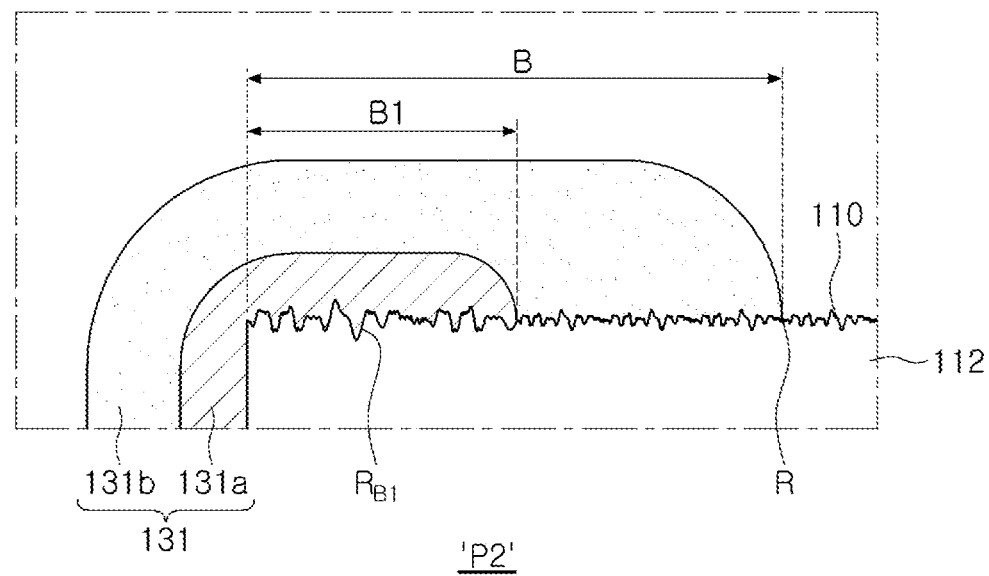
FIG. 6 is an enlarged diagram illustrating region P2 illustrated in FIG. 2.

FIG. 6 is an enlarged diagram illustrating region P2 illustrated in FIG. 2.

Figure 7:
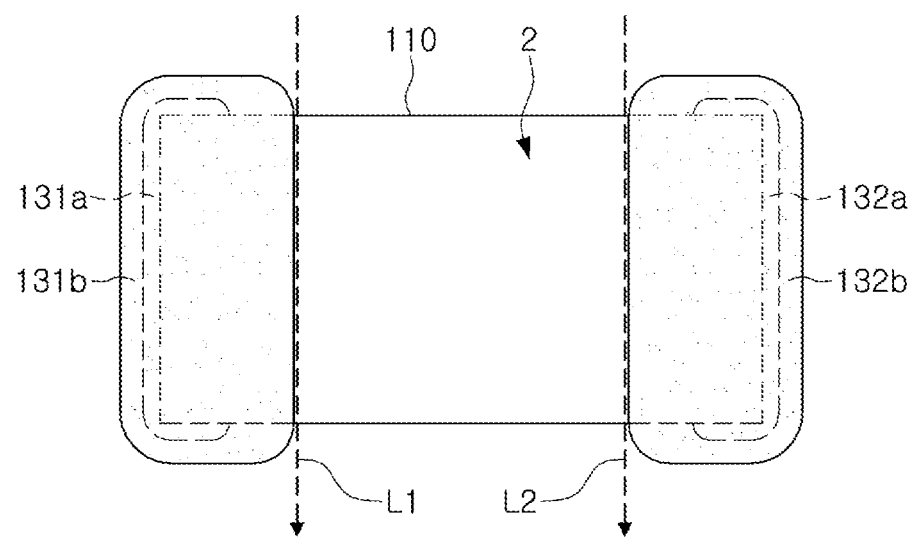
FIG. 7 is a diagram illustrating a method for measuring surface roughness of a body on an end of a conductive resin layer.

FIG. 7 is a diagram illustrating a method for measuring surface roughness of a body on an end of a conductive resin layer.

In the description below, a multilayer electronic component will be described in greater detail in accordance with an example embodiment with reference to FIGS. 1 to 7.

A multilayer electronic component 100 may include a body 110 including a dielectric layer 111 and a capacitance forming portion A forming capacitance including first and second internal electrodes 121 and 122 alternately layered with the dielectric layer 111 interposed therebetween and upper and lower cover portions 112 and 113 disposed on and below the capacitance forming portion A, and including first and second surfaces 1 and 2 opposing each other in the layering direction, third and fourth surfaces 3 and 4 connected to the first and second surfaces 1 and 2 and opposing each other, and fifth and sixth surfaces 5 and 6 connected to the first to fourth surfaces 1 to 4 and opposing each other, a first external electrode 131 disposed on the third surface, connected to the first internal electrode, and including a first electrode layer 131a extending to a portion of each of the first, second, fifth, and sixth surfaces and a first conductive resin layer 131b covering the first electrode layer, and a second external electrode 132 disposed on the fourth surface, connected to the second internal electrode, and including a second electrode layer 132a extending to a portion of each of the first, second, fifth, and sixth surfaces and a second conductive resin layer 132b covering the second electrode layer. When a maximum surface roughness of each of the first and second surfaces on ends of the first and second conductive resin layers is defined as Rmax, and a thickness of each of the upper and lower cover portions is defined as Tp, Tp/Rmax may be 30 or higher. In one example, Tp may be an average thickness of the upper cover portion 112, or an average thickness of the lower cover portion 113.

In the body 110, the dielectric layer 111 and the internal electrodes 121 and 122 may be alternately layered.

The body 110 may not be limited to any particular shape. As illustrated, the body 110 may have a hexahedral shape or a shape similar to a hexahedron. Due to contraction of a ceramic powder particles included in the body 110 during a sintering process, the body 110 may not have an exactly hexahedral shape with perfectly straight lines, but may have a substantially hexahedral shape.

The body 110 may have first and second surfaces 1 and 2 opposing each other in a thickness direction (Z direction), third and fourth surfaces 3 and 4 connected to the first and second surfaces 1 and 2 and opposing each other in a length direction (X direction), and fifth and sixth surfaces 5 and 6 connected to the first and second surfaces 1 and 2 and the third and fourth surfaces 3 and 4, and opposing each other in a width direction (Y direction).

The plurality of the dielectric layers 111 forming the body 110 may be in a sintered state, and may be integrated such that boundaries between adjacent dielectric layers 111 may be difficult to identify without using a scanning electron microscope (SEM).

According to the example embodiment, a material of the dielectric layer 111 may not be limited to any particular material as long as sufficient capacitance is able to be obtained therewith. For example, as the material, a barium titanate material, a Perovskite material compound with lead (Pb), a strontium titanate material, or the like, may be used. The barium titanate material may include a $BaTiO_3$-based ceramic powder particle, and an example of the ceramic powder particles may include $BaTiO_3$, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), and the like, are partially solid-solute in $BaTiO_3$, or the like.

As the material of the dielectric layer 111, various ceramic additives, organic solvents, plasticizers, coupling agents, dispersing agents, and the like, may be added in addition to power such as barium titanate ($BaTiO_3$) powder, or the like, depending on an intended purpose.

The body 110 may include the capacitance forming portion A disposed in the body 110 and forming capacitance including the first internal electrode 121 and the second internal electrode 122 opposing each other with the dielectric layer 111 interposed therebetween, an upper cover portion 112 disposed on the capacitance forming portion A and a lower cover portion 113 disposed below the capacitance forming portion A.

The capacitance forming portion A may contribute to forming capacitance of the capacitor, and may be formed by alternatively layering the plurality of first and second internal electrodes 121 and 122 with the dielectric layer 111 interposed therebetween.

The upper cover portion 112 and the lower cover portion 113 may be formed by disposing a single dielectric layer or two or more dielectric layers on each of upper and lower surfaces of the capacitance forming portion, and may prevent damage to an internal electrode caused by physical or chemical stress.

The upper cover portion 112 and the lower cover portion 113 may not include an internal electrode, and may include a material the same as a material of the dielectric layer 111.

The plurality of internal electrodes 121 and 122 may oppose each other with the dielectric layer 111 interposed therebetween.

The internal electrodes 121 and 122 may include the first and second internal electrodes 121 and 122 alternately disposed with the dielectric layer 111 interposed therebetween and opposing each other.

The first and second internal electrodes 121 and 122 may be exposed to the third and fourth surfaces 3 and 4 of the body 110, respectively.

Referring to FIG. 2, the first internal electrode 121 may be spaced apart from the fourth surface 4 and may be exposed through the third surface 3. The second internal electrode 122 may be spaced apart from the third surface 3 and may be exposed through the fourth surface 4. The first external electrode 131 may be disposed on the third surface 3 of the body and may be connected to the first internal electrode 121, and the second external electrode 132 may be disposed on the fourth surface 4 of the body and may be connected to the second internal electrode 122.

The first and second internal electrodes 121 and 122 may be electrically isolated from each other by the dielectric layer 111 interposed therebetween.

Referring to FIG. 4, the body 110 may be formed by alternatively layering the dielectric layer 111 on which the first internal electrode 121 is printed and the dielectric layer 111 on which the second internal electrode 122 is printed in the thickness direction (Z direction) and performing a sintering process.

A material for forming the first and second internal electrodes 121 and 122 may not be limited to any particular material. For example, the first and second internal electrodes 121 and 122 may be formed using a conductive paste including one or more of nickel (Ni), copper (Cu), palladium (Pd), silver (Ag), gold (Au), platinum (Pt), tin (Sn), tungsten (W), titanium (Ti), and alloys thereof.

As a method of printing the conductive paste, a screen-printing method, a gravure printing method, or the like, may be used, but the method is not limited thereto.

The external electrodes 131 and 132 may be disposed in the body 110 and may be connected to the internal electrodes 121 and 122. As illustrated in FIG. 2, the external electrodes 131 and 132 may include the first and second external electrodes 131 and 132 connected to the first and second internal electrodes 121 and 122, respectively.

The first and second external electrodes 131 and 132 may be connected to the first and second internal electrodes 121 and 122, respectively, to form capacitance, and the second external electrode 132 may be connected to a potential different from a potential to which the first external electrode 131 is connected.

The first external electrode 131 may include the first electrode layer 131a and the first conductive resin layer 131b.

The first electrode layer 131a may be disposed on the third surface 3, may be connected to the first internal electrode 121, and may extend to a portion of each of the first, second, fifth, and sixth surfaces 1, 2, 5, and 6. The first conductive resin layer 131b may cover the first electrode layer 131a.

The second external electrode 132 may include the second electrode layer 132a and the second conductive resin layer 132b.

The second electrode layer 132a may be disposed on the fourth surface 4, may be connected to the second internal electrode 122, and may extend to a portion of each of the first, second, fifth, and sixth surfaces 1, 2, 5, and 6. The second conductive resin layer 132b may cover the second electrode layer 132a.

A region of the external electrodes 131 and 132 disposed on the third and fourth surfaces may be defined as a connection portion C, and a region disposed on the first, second, fifth, and sixth surfaces 1, 2, 5, and 6 may be defined as a band portion B.

The first external electrode 131 may include the connection portion C disposed on the third surface of the body and the band portion B extending from the connection portion C to a portion of each of the first, second, fifth, and sixth surfaces 1, 2, 5, and 6. Similarly, the second external electrode 132 may include the connection portion C disposed on the fourth surface of the body and the band portion B extending from the connection portion C to a portion of each of the first, second, fifth, and sixth surfaces 1, 2, 5, and 6.

In the example embodiment, when a maximum surface roughness of each of the first and second surfaces 1 and 2 on ends of the first and second conductive resin layers 131b and 132b is defined as Rmax, and a thickness of each of the upper and lower cover portions is defined as Tp, Tp/Rmax may be 30 or higher.

When warpage stress is applied to the multilayer electronic component 100, the conductive resin layers 131b and 132b may peel off and may alleviate stress. Accordingly, stress applied to the body 110 may be reduced such that cracks in the body may be prevented.

When a maximum surface roughness of each of the first and second surfaces 1 and 2 on the ends of the conductive resin layers 131b and 132b is relatively high, however, warpage cracks may be created in the body 110 before the conductive resin layers 131b and 132b peel off. The warpage cracks created in the body 110 may work as a moisture permeation route such that moisture resistance reliability may degrade.

Warpage stress applied to a chip mounted on a substrate may be propagated from the ends of the conductive resin layers 131b and 132b towards an outer region. When a maximum surface roughness of each of the first and second surfaces 1 and 2 on the ends of the conductive resin layers 131b and 132b is high, stress may not be distributed and may be concentrated on a peak or a valley of a surface roughness such that warpage cracks may be created. Accordingly, a maximum surface roughness of each of the first and second surfaces 1 and 2 on the ends of the conductive resin layers 131b and 132b may be an important factor which may determine a degree of distribution of warpage stress.

Also, the more the thickness Tp of the cover portion is reduced, the more warpage stress may be concentrated. Thus, the thickness Tp of the cover portion may also be an important factor which may determine a degree of distribution of warpage stress.

Thus, it may be difficult to prevent warpage cracks in the body 110 before the peeling off occurs in consideration of only one of the thickness Tp of the cover portion and the maximum surface roughness Rmax of each of the first and second surfaces 1 and 2 on the ends of the conductive resin layers 131b and 132b.

In the example embodiment, to prevent warpage cracks in the body 110 before the peeling off occurs, Tp/Rmax may be controlled to be 30 or higher in consideration of correlation between the thickness Tp of the cover portion and the maximum surface roughness Rmax of each of the first and second surfaces 1 and 2 on the ends of the conductive resin layers 131b and 132b.

Also, by controlling Tp/Rmax to be 30 or higher, stress may be distributed such that warpage strength may improve, and 5 mm or more of warpage strength may be secured.

When Tp/Rmax is less than 30, warpage cracks may be created in the body 110 before the conductive resin layers 131b and 132b peel off, and moisture resistance reliability may degrade.

Tp may be 10 μm or greater and 300 μm or less.

When Tp is less than 10 μm, the effect of distribution of warpage stress may be insufficient. When Tp is greater than 300 μm, it may be difficult to secure high capacitance.

Rmax may be 9 μm or less.

When Rmax exceeds 9 μm, the effect of distribution of warpage stress may be insufficient. As another example, Rmax may be 8 μm or less, or alternatively, Rmax may be 7 μm or less.

Surface roughness may refer to a degree of serrations formed on a surface when the surface is processed.

Surface roughness may be created by a tool used for a process, whether a process method is appropriate or not, scratches on a surface, rust, an etching process, and the like. With respect to representing a degree of roughness, a surface may be cut out perpendicularly and a cross-sectional surface formed by the cutting out may have serrations or unevenness. A height from a top to a bottom of the cross-sectional surface may be defined as a maximum surface roughness.

Referring to FIG. 5, Rmax, a height from a top to a bottom, may be determined as a maximum surface roughness of the second surface 2 on the end of the second conductive resin layer 132b.

Referring to FIG. 7, as a method for measuring Rmax, a method of measuring one-dimensional roughness along L1 or L2 may be used.

A method for controlling the maximum surface roughness Rmax of each of the first and second surfaces 1 and 2 on the ends of the conductive resin layers 131b and 132b may not be limited to any particular method. For example, the maximum surface roughness Rmax of each of the first and second surfaces 1 and 2 on the ends of the conductive resin layers 131b and 132b may be controlled by controlling a surface roughness of a compressed subsidiary material or conditions for grinding a chip.

As a method for prescribing surface roughness, an arithmetical average roughness may be used instead of a maximum surface roughness.

Referring to FIG. 6, as a method for calculating an arithmetical average roughness, a conceptual arithmetical average line Rc may be disposed with respect to a surface roughness of the second surface 2 on the end of the first conductive resin layer 131b.

Each distance (e.g., $r_1, r_2, r_3 \ldots r_n$) may be measured with reference to the conceptual arithmetical average line Rc of the surface roughness, and an arithmetical average roughness may be calculated using an average value of the distances as in Equation 1. In one example, Tp may be a dimension in the thickness direction from an upper surface of the uppermost internal electrode to the conceptual arithmetical average line Rc, or Tp may be a dimension in the thickness direction from a lower surface of the lowermost internal electrode to a conceptual arithmetical average line adjacent to the first surface 1.

$$\text{arithmetical-average-roughness} = \frac{|r_1| + |r_1| + |r_2| + |r_3| + \ldots + |r_n|}{n} \quad \text{[Equation 1]}$$

In the example embodiment, when an arithmetical average roughness Ra of each of the first and second surfaces 1 and 2 on the ends of the conductive resin layers 131b and 132b is defined as Ra, Tp/Ra may be 50 or higher.

In the example embodiment, to prevent warpage cracks in the body 110 before the conductive resin layers 131b and 132b peel off, Tp/Ra may be controlled to be 50 or higher in consideration of correlation between the thickness Tp of the cover portion and the arithmetical average roughness Ra of each of the first and second surfaces 1 and 2 on the ends of the conductive resin layers 131b and 132b.

Also, by controlling Tp/Ra to be 50 or higher, stress may be distributed such that warpage strength may improve, and 5 mm or more of warpage strength may be secured.

When Tp/Ra is less than 50, warpage cracks may be created in the body 110 before the conductive resin layers 131b and 132b peel off, and moisture resistance reliability may degrade.

Ra may be 7 μm or less.

When Ra exceeds 7 μm, the effect of distribution of warpage stress may be insufficient. As another example, Ra may be 6 μm or less, or alternatively, Ra may be 4 μm or less.

In the example embodiment, an arithmetical average roughness $R_{B1}$ of the first and second surfaces in contact with the first and second conductive resin layers 131b and 132b may be greater than Ra.

When warpage stress is applied to the multilayer electronic component 100, the conductive resin layers 131b and 132b may peel off such that stress may be alleviated. Accordingly, stress applied to the body 110 may be reduced such that cracks in the body may be prevented.

However, as conductive resin layers peel off, electrode layers respectively disposed on the conductive resin layers may also peel off, or oxidation may occur on the ends of the electrode layers. Accordingly, moisture may permeate the ends of a portion in which the peeling off occurs or the exposed ends of the electrode layers such that insulation resistance may degrade or shorts may occur.

In the example embodiment, by controlling the arithmetical average roughness $R_{B1}$) of each of the first and second surfaces in contact with the first and second electrode layers to be greater than Ra, even when the conductive resin layers 131b and 132b peel off, the electrode layers 131a and 132a may be prevented from peeling off or oxidation on the exposed ends of the electrode layers 131a and 132a may be prevented. Accordingly, the degradation of insulation resistance or shorts may be prevented.

In the example embodiment, the body 110 may include first and second margin portions 114 and 115 disposed on both side surfaces of the capacitance forming portion A.

The first and second margin portions 114 and 115 may refer to a region between both ends of the first and second internal electrodes 121 and 122 and a boundary surface of the body 110 on a cross-sectional surface taken in a width-thickness (W-T) direction of the body 110.

The first and second margin portions 114 and 115 may prevent damages to the internal electrodes caused by physical or chemical stress.

The first and second margin portions 114 and 115 may not include internal electrodes, and may include a material the same as a material of the dielectric layer 111.

When a width, in the width direction, of each of the first and second margin portions 114 and 115 is defined as Wm, and a maximum surface roughness of each of the fifth and sixth surfaces on the ends of the first and second conductive resin layers 131b and 132b is defined as R2max, Wm/R2max may be 30 or higher.

By controlling Wm/R2max to be 30 or higher, warpage cracks may be prevented in the body 110 before the conductive resin layers 131b and 132b peel off, and also, warpage stress may be distributed such that warpage strength may improve, and 5 mm or more of warpage strength may easily be secured.

When a width, in the width direction, of each of the first and second margin portions 114 and 115 is defined as Wm, and an arithmetical average roughness of each of the fifth and sixth surfaces on the ends of the first and second conductive resin layers 131b and 132b is defined as R2a, Wm/R2a may be 50 or higher.

By controlling Wm/R2a to be 50 or higher, warpage cracks may be prevented in the body 110 before the conductive resin layers 131b and 132b peel off, and also, warpage stress may be distributed such that warpage strength may improve, and 5 mm or more of warpage strength may easily be secured.

An arithmetical average roughness of each of the fifth and sixth surfaces in contact with the first and second electrode layers 131a and 132a may be greater than R2a.

By controlling an arithmetical average roughness of each of the fifth and sixth surfaces in contact with the first and second electrode layers 131a and 132a to be greater than R2a, even when the conductive resin layers 131b and 132b peel off, the electrode layers 131a and 132a may be prevented from peeling off or oxidation on the exposed ends of the electrode layers 131a and 132a may be prevented. Accordingly, the degradation of insulation resistance or shorts may be prevented.

The electrode layers 131a and 132a may include a conductive metal and glass.

A conductive metal included in the electrode layers 131a and 132a may not be limited to any particular material. Any material which may be electrically connected to the internal electrode to form capacitance may be used. For example, as a conductive metal used for the electrode layers 131a and 132a, nickel (Ni), copper (Cu), palladium (Pd), silver (Ag), gold (Au), platinum (Pt), tin (Sn), tungsten (W), titanium (Ti), and alloys thereof may be used.

The electrode layers 131a and 132a may be formed by applying a conductive paste prepared by adding glass frit to the conductive metal powder, and performing a sintering process.

The conductive resin layers 131b and 132b may include a conductive metal and a base resin.

A conductive metal included in the conductive resin layers 131b and 132b may allow the conductive resin layers 131b and 132b to electrically connect to the electrode layers 131a and 132a.

A conductive metal included in the conductive resin layers 131b and 132b may not be limited to any particular material. Any material which may be electrically connected to the electrode layers 131a and 132a may be used. For example, as a conductive metal included in the conductive resin layers 131b and 132b, nickel (Ni), copper (Cu), palladium (Pd), silver (Ag), gold (Au), platinum (Pt), tin (Sn), tungsten (W), titanium (Ti), or alloys thereof may be used.

A conductive metal included in the conductive resin layers 131b and 132b may include one or more of spherical powder and flake powder. Accordingly, the conductive metal may only include flake powder, or may only include spherical powder, or may include a mixture of flake powder and spherical powder.

The spherical powder may also include power particles which do not have a completely spherical shape. For example, the spherical powder may include powder particles each having a length ratio between a major axis and a minor axis (a major axis/a minor axis) to be 1.45 or lower.

The flake powder may refer to powder particles each having a flat and elongated shape. A length ratio between a major axis and a minor axis (a major axis/a minor axis) of a particle of the flake powder may be 1.95 or higher, for example, although an example embodiment thereof is not limited thereto.

A length of each of a major axis and a minor axis of a particle of the spherical powder and a particle of the flake powder may be measured from an image of a cross-sectional surface taken in an X and Z direction (L-T cross-sectional surface) of a central portion of the multilayer electronic component taken in a width (Y) direction, obtained using a scanning electron microscope (SEM).

A base resin included in the conductive resin layers 131b and 132b may secure adhesiveness and may absorb impacts.

A base resin included in the conductive resin layers 131b and 132b may not be limited to any particular material, and any material which has adhesiveness and impact absorption and can be used to make paste by being mixed with conductive metal powder may be used. For example, the base resin may be implemented by an epoxy resin.

The external electrodes 131 and 132 may further include plating layers disposed on the conductive resin layers 131b and 132b to improve mounting properties.

For example, the plating layers may be configured as plating layers including one or more of Ni, Sn, Pd, and alloys thereof, or may include a plurality of layers.

Embodiment

Sample chips were manufactured while changing the thickness Tp of the cover portion, the maximum surface roughness Rmax of the second surface on the ends of the conductive resin layers 131b and 132b, and the arithmetical average roughness Ra. Referring to FIG. 7, as for the maximum surface roughness Rmax and the arithmetical average roughness Ra, a method of measuring one-dimensional roughness along L1 was used.

Table 1 relates to assessment of cracks formed in 60 manufactured sample chips of each of test Nos.

As for the assessment of cracks, a sample chip was mounted on a substrate, a distance from a central portion at which pressure was applied when the bending occurs was determined to be 5 mm, and whether cracks were created in the sample chip was observed. The number of sample chips in which cracks were created based on the total number of sample chips is listed.

TABLE 1

| Test No. | Tp(μm) | Ra(μm) | Rmax(μm) | Tp/Rmax | Tp/Ra | Assessment of Cracks |
|---|---|---|---|---|---|---|
| 1* | 210 | — | 9.55 | 21.99 | — | 6/120 |
| 2* | 85 | — | 3.40 | 24.98 | — | 5/120 |
| 3 | 155 | 2.44 | 3.59 | 43.18 | 63.52 | 0/60 |
| 4* | 155 | 5.48 | 18.50 | 8.38 | 28.28 | 13/60 |
| 5* | 155 | 4.06 | 10.81 | 14.34 | 38.18 | 5/60 |
| 6 | 220 | 3.68 | 6.27 | 35.09 | 59.78 | 0/60 |
| 7* | 220 | 7.49 | 16.18 | 13.60 | 29.37 | 7/60 |
| 8* | 220 | 7.25 | 18.24 | 12.06 | 30.34 | 7/60 |

Referring to Table 1, in test Nos. 1, 2, 4, 5, and 7 in which Tp/Rmax was less than 30, warpage cracks were created in several sample chips, which indicates that resistance against warpage cracks degraded.

In test Nos. 3 and 6 in which Tp/Rmax was 30 or higher, there were no sample chips in which warpage cracks were created among the 60 sample chips, which indicates that resistance against warpage cracks was excellent.

According to the aforementioned example embodiments, by controlling correlation between a thickness of the cover portion and the surface roughness of the body on the ends of the conductive resin layers, warpage strength properties may improve.

Also, moisture resistance reliability may improve.

While the exemplary embodiments have been shown and described above, it will be apparent to those skilled in the art that modifications and variations could be made without departing from the scope of the present invention as defined by the appended claims.

What is claimed is:

1. A multilayer electronic component, comprising:
   a body including dielectric layers and a capacitance forming portion including first and second internal electrodes alternately layered in a layering direction with a respective one of the dielectric layers interposed therebetween and upper and lower cover portions respectively disposed on and below the capacitance forming portion, the body including first and second surfaces opposing each other in the layering direction, third and fourth surfaces connected to the first and second surfaces and opposing each other, and fifth and sixth surfaces connected to the first to fourth surfaces and opposing each other;
   a first external electrode disposed on the third surface, connected to the first internal electrode, and including a first electrode layer extending to a portion of each of the first, second, fifth, and sixth surfaces and a first conductive resin layer covering the first electrode layer; and
   a second external electrode disposed on the fourth surface, connected to the second internal electrode, and including a second electrode layer extending to a portion of each of the first, second, fifth, and sixth surfaces and a second conductive resin layer covering the second electrode layer, wherein Tp/Rmax is 30 or higher, in which Rmax is defined as a maximum surface roughness of each of the first and second surfaces on ends of the first and second conductive resin layers, and Tp is defined as a thickness of each of the upper and lower cover portions.

2. The multilayer electronic component of claim 1, wherein Tp is 10 μm or greater and 300 μm or less.

3. The multilayer electronic component of claim 1, wherein Rmax is 9 μm or less.

4. The multilayer electronic component of claim 1, wherein Tp/Ra is 50 or higher, in which Ra is defined as arithmetical average roughness of each of the first and second surfaces on the ends of the first and second conductive resin layers.

5. The multilayer electronic component of claim 4, wherein Ra is 7 μm or less.

6. The multilayer electronic component of claim 4, wherein an arithmetical average roughness of each of the first and second surfaces in contact with the first and second electrode layers is greater than Ra.

7. The multilayer electronic component of claim 1, wherein the body includes first and second margin portions disposed on both side surfaces of the capacitance forming portion, respectively.

8. The multilayer electronic component of claim 7, wherein Wm/R2max is 30 or higher, in which Wm is defined as a dimension, in a direct connecting the fifth and sixth surfaces, of each of the first and second margin portions, and R2max is defined as a maximum surface roughness of each of the fifth and sixth surfaces on the ends of the first and second conductive resin layers.

9. The multilayer electronic component of claim 7, wherein Wm/R2a is 50 or higher, in which Wm is defined as a dimension, in a direct connecting the fifth and sixth surfaces, of each of the first and second margin portions, and R2a is defined as an arithmetical average roughness of each of the fifth and sixth surfaces on the ends of the first and second conductive resin layers.

10. The multilayer electronic component of claim 9, wherein an arithmetical average roughness of each of the fifth and sixth surfaces in contact with the first and second electrode layers is greater than R2a.

11. The multilayer electronic component of claim 1, wherein the first and second electrode layers include a conductive metal and glass.

12. The multilayer electronic component of claim 1, wherein the first and second conductive resin layers include a conductive metal and a base resin.

13. The multilayer electronic component of claim 1, wherein Tp/Rmax is 35.09 or higher.

14. A multilayer electronic component, comprising:
   a body including dielectric layers and a capacitance forming portion including first and second internal electrodes alternately layered in a layering direction with a respective one of the dielectric layers interposed therebetween and upper and lower cover portions respectively disposed on and below the capacitance forming portion, the body including first and second surfaces opposing each other in the layering direction, third and fourth surfaces connected to the first and second surfaces and opposing each other, and fifth and sixth surfaces connected to the first to fourth surfaces and opposing each other;
   a first external electrode disposed on the third surface, connected to the first internal electrode, and including a first electrode layer extending to a portion of each of the first, second, fifth, and sixth surfaces and a first conductive resin layer covering the first electrode layer; and
   a second external electrode disposed on the fourth surface, connected to the second internal electrode, and including a second electrode layer extending to a portion of each of the first, second, fifth, and sixth surfaces and a second conductive resin layer covering the second electrode layer,
   wherein Tp/Ra is 50 or higher, in which Ra is defined as arithmetical average roughness of each of the first and second surfaces on the ends of the first and second conductive resin layers and Tp is defined as a thickness of each of the upper and lower cover portions.

15. The multilayer electronic component of claim 14, wherein Tp/Ra is 59.78 or higher.

16. The multilayer electronic component of claim 14, wherein Ra is 7 μm or less.

17. The multilayer electronic component of claim 14, wherein Tp is 10 μm or greater and 300 μm or less.

18. The multilayer electronic component of claim 14, wherein an arithmetical average roughness of each of the first and second surfaces in contact with the first and second electrode layers is greater than Ra.

19. The multilayer electronic component of claim 14, wherein the body includes first and second margin portions disposed on both side surfaces of the capacitance forming portion, respectively, and Wm/R2max is 30 or higher, in which Wm is defined as a dimension, in a direct connecting the fifth and sixth surfaces, of each of the first and second margin portions, and R2max is defined as a maximum surface roughness of each of the fifth and sixth surfaces on the ends of the first and second conductive resin layers.

20. The multilayer electronic component of claim 14, wherein the body includes first and second margin portions disposed on both side surfaces of the capacitance forming portion, respectively, and Wm/R2a is 50 or higher, in which Wm is defined as a dimension, in a direct connecting the fifth and sixth surfaces, of each of the first and second margin portions, and R2a is defined as an arithmetical average roughness of each of the fifth and sixth surfaces on the ends of the first and second conductive resin layers.

\* \* \* \* \*